(12) United States Patent
Iwai

(10) Patent No.: US 11,167,949 B2
(45) Date of Patent: Nov. 9, 2021

(54) IMAGE FORMING APPARATUS AND SHEET MANAGEMENT SYSTEM

(71) Applicant: KONICA MINOLTA, INC., Tokyo (JP)

(72) Inventor: Hidetaka Iwai, Itami (JP)

(73) Assignee: KONICA MINOLTA, INC., Tokyo (JP)

( * ) Notice: Subject to any disclaimer, the term of this patent is extended or adjusted under 35 U.S.C. 154(b) by 113 days.

(21) Appl. No.: 16/794,727

(22) Filed: Feb. 19, 2020

(65) Prior Publication Data

US 2020/0270092 A1    Aug. 27, 2020

(30) Foreign Application Priority Data

Feb. 25, 2019    (JP) .............................. JP2019-031775

(51) Int. Cl.
*B65H 33/04*  (2006.01)
*B65H 37/02*  (2006.01)
*G06K 9/00*   (2006.01)

(52) U.S. Cl.
CPC ......... *B65H 37/02* (2013.01); *G06K 9/00456* (2013.01); *B65H 2301/5161* (2013.01)

(58) Field of Classification Search
CPC .............................. B65H 33/04; B65H 37/02; B65H 2301/5161; G06K 9/00456; G06K 9/0042; G06F 3/1244; G06F 3/1242; G06F 3/1208; G06F 3/1285
See application file for complete search history.

(56) References Cited

U.S. PATENT DOCUMENTS

| 5,316,279 A * | 5/1994 | Corona ................. B65H 31/10 270/1.01 |
| 6,687,878 B1 * | 2/2004 | Eintracht ................ H04L 51/16 715/201 |
| 6,729,376 B1 * | 5/2004 | Kakinuma ............. B65H 33/04 156/256 |

(Continued)

FOREIGN PATENT DOCUMENTS

| JP | 2009015559 A | 1/2009 |
| JP | 2016068440 A | 5/2016 |
| JP | 2018016006 A | 2/2018 |

*Primary Examiner* — Patrick H Mackey
(74) *Attorney, Agent, or Firm* — Buchanan Ingersoll & Rooney PC

(57) ABSTRACT

An image forming apparatus that assists classification of printed sheets of documents of print jobs includes: a correspondence table showing correspondence between sticky note attributes and keywords; and a hardware processor. The attributes represent appearance features of sticky notes to be attached to edges of the sheets so as to protrude from the edges. The keywords are extracted from the documents and denote topics of the documents. In response to execution request of a new print job, the hardware processor extracts a keyword from a document of the new job, judges whether the extracted keyword partially matches any keyword in the correspondence table, and when judging positively, creates a new sticky note attribute partially having an appearance feature represented by the sticky note attribute corresponding to the partially matching keyword in the correspondence table, and adds the new sticky note attribute to the correspondence table together with the extracted keyword.

16 Claims, 10 Drawing Sheets

(56) References Cited

U.S. PATENT DOCUMENTS

| | | | |
|---|---|---|---|
| 8,020,856 B2* | 9/2011 | Morohashi | B65H 33/04 |
| | | | 271/184 |
| 8,508,756 B2* | 8/2013 | Komaki | G06K 9/2072 |
| | | | 358/1.13 |
| 8,854,635 B2* | 10/2014 | Mishima | G06F 16/93 |
| | | | 358/1.11 |
| 10,402,487 B1* | 9/2019 | Fournier, II | G06F 40/134 |
| 10,779,031 B2* | 9/2020 | Hisano | H04N 21/4312 |
| 2008/0270879 A1* | 10/2008 | Komatsu | G06K 9/2063 |
| | | | 715/200 |

* cited by examiner

FIG. 4A

Color palette

| Yellow | Pink | Light blue | Red | Blue |  | Green | Purple | White | Black |

← Corresponding to major groups

Vermilion

FIG. 4B

Position gauge

| 0cm | 2cm | 4cm | 6cm | 8cm | 12cm | 14cm | ⋯ | 24cm | 26cm | 28cm |

← Corresponding to minor groups

FIG. 4C

| 1st job | Module XXX Functional Specifications |
| 2nd job | Module YYY Functional Specifications |
| 3rd job | Module XXX Internal Design Material |
| 4th job | Module XXX Control Procedure Manual |
| 5th job | Module YYY Internal Design Material |
| 6th job | Module ZZZ Functional Specifications |
| 7th job | Module ZZZ Internal Design Material |
| 8th job | Module YYY Control Procedure Manual |
| 9th job | Module ZZZ Control Procedure Manual |

FIG. 4D

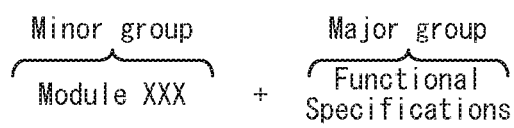

Minor group: Module XXX + Major group: Functional Specifications

FIG. 4E

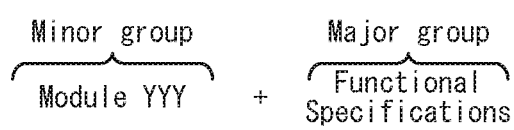

Minor group: Module YYY + Major group: Functional Specifications

FIG. 6A

|  | Functional Specifications | |
|---|---|---|
| Module XXX | Yellow | y = 0 cm |

FIG. 6B

|  | Functional Specifications | |
|---|---|---|
| Module XXX | Yellow | y = 0 cm |
| Module YYY | Yellow | y = 2 cm | in2, nx2

FIG. 6C

|  | Functional Specifications | | Internal Design Material | |
|---|---|---|---|---|
| Module XXX | Yellow | y = 0 cm | Pink | y = 0 cm |
| Module YYY | Yellow | y = 2 cm |  |  | nx3, in3

FIG. 6D

|  | Functional Specifications | | Internal Design Material | | Control Procedure Manual | |
|---|---|---|---|---|---|---|
| Module XXX | Yellow | y = 0 cm | Pink | y = 0 cm | Light blue | y = 0 cm |
| Module YYY | Yellow | y = 2 cm |  |  |  |  | nx4, in4

FIG. 6E

|  | Functional Specifications | | Internal Design Material | | Control Procedure Manual | |
|---|---|---|---|---|---|---|
| Module XXX | Yellow | y = 0 cm | Pink | y = 0 cm | Light blue | y = 0 cm |
| Module YYY | Yellow | y = 2 cm | Pink | y = 2 cm |  |  | in5, nx5

FIG. 6F

|  | Functional Specifications | | Internal Design Material | | Control Procedure Manual | |
|---|---|---|---|---|---|---|
| Module XXX | Yellow | y = 0 cm | Pink | y = 0 cm | Light blue | y = 0 cm |
| Module YYY | Yellow | y = 2 cm | Pink | y = 2 cm |  |  |
| Module ZZZ | Yellow | y = 4 cm |  |  |  |  | in6, nx6

FIG. 7A

|  | Functional Specifications | | Internal Design Material | | Control Procedure Manual | |
|---|---|---|---|---|---|---|
| Module XXX | Yellow | y = 0 cm | Pink | y = 0 cm | Light blue | y = 0 cm |
| Module YYY | Yellow | y = 2 cm | Pink | y = 2 cm | | |
| Module ZZZ | Yellow | y = 4 cm | Pink | y = 4 cm | | | in7, nx7

FIG. 7B

|  | Functional Specifications | | Internal Design Material | | Control Procedure Manual | |
|---|---|---|---|---|---|---|
| Module XXX | Yellow | y = 0 cm | Pink | y = 0 cm | Light blue | y = 0 cm |
| Module YYY | Yellow | y = 2 cm | Pink | y = 2 cm | Light blue | y = 2 cm |
| Module ZZZ | Yellow | y = 4 cm | Pink | y = 4 cm | | | in8, nx8

FIG. 7C

|  | Functional Specifications | | Internal Design Material | | Control Procedure Manual | |
|---|---|---|---|---|---|---|
| Module XXX | Yellow | y = 0 cm | Pink | y = 0 cm | Light blue | y = 0 cm |
| Module YYY | Yellow | y = 2 cm | Pink | y = 2 cm | Light blue | y = 2 cm |
| Module ZZZ | Yellow | y = 4 cm | Pink | y = 4 cm | Light blue | y = 4 cm | in9, nx9

Sticky note color / Sticky note attachment position

FIG. 8A

| 1st job | Module XXX Functional Specifications | Yellow, y = 0 cm |
|---|---|---|
| 2nd job | Module YYY Functional Specifications | Yellow, y = 2 cm |
| 3rd job | Module XXX Internal Design Material | Pink, y = 0 cm |
| 4th job | Module XXX Control Procedure Manual | Light blue, y = 0 cm |
| 5th job | Module YYY Internal Design Material | Pink, y = 2 cm |
| 6th job | Module ZZZ Functional Specifications | Yellow, y = 4 cm |
| 7th job | Module ZZZ Internal Design Material | Pink, y = 4 cm |
| 8th job | Module YYY Control Procedure Manual | Light blue, y = 2 cm |
| 9th job | Module ZZZ Control Procedure Manual | Light blue, y = 4 cm |

FIG. 8B

| User A | User B |
|---|---|
| Functional Specifications | Business Efficiency |
| Internal Design Material | Customer Attraction Efficiency |
| Control Procedure Manual | Improvement Suggestions |
| Module XXX | Report of Improvement Results |
| Module YYY | ⋮ |
| Module ZZZ | ⋮ |

| Category | Functional Specifications | | Internal Design Material | | Control Procedure Manual | |
|---|---|---|---|---|---|---|
| Module XXX | Yellow | y = 0 cm | Pink | y = 0 cm | Light blue | y = 0 cm |
| Module YYY | Yellow | y = 2 cm | Pink | y = 2 cm | Light blue | y = 2 cm |
| Module ZZZ | Yellow | y = 4 cm | Pink | y = 4 cm | Light blue | y = 4 cm |
| ⋮ | ⋮ | ⋮ | ⋮ | ⋮ | ⋮ | ⋮ |

Sticky note color    Sticky note attachment position

IMAGE FORMING APPARATUS AND SHEET MANAGEMENT SYSTEM

This application claims priority to Japanese Patent Application No. 2019-031775 filed Feb. 25, 2019, the contents of which are hereby incorporated herein by reference in their entirety.

BACKGROUND

Technological Field

The present disclosure relates to image forming apparatuses and improvement in an assistance function of assisting sheet classification with use of sticky notes.

Description of the Related Art

In offices installed with image forming apparatuses, sheets of documents printed by the image forming apparatuses are often bound by clips, staplers, files, or the like, and are stacked flat at various locations.

It is impossible to immediately understand respective contents of many printed sheets of documents that are bound into a single bundle, causing disadvantages of insufficient filing and management of such printed sheets. To supplement such disadvantages, many offices have conventionally classified printed sheets with use of sticky notes.

Sticky notes are pieces of papers temporarily sticky to sheets, and include widely known stationary items such as label seals, tack indexes, tag seals, and Post-it™ produced by 3M Company.

By attaching such sticky notes to printed sheets, a user can take a desired one among the printed sheets with use of an attached sticky note protruding from the edge of the sheet as a hint, even when the desired one is stacked under other sheets.

Such sheet classification by sticky note attachment is performed manually by users. Meanwhile, some types of image forming apparatuses have conventionally perform automatic sheet classification by creating sticky note images having colors and shapes which represent sticky notes in margin areas on sheets of documents.

Japanese Patent Application Publication No. 2018-16006 discloses an image forming apparatus that creates a classification image of the same color with respect to pages whose margin areas have the same or similar supplementary information.

Also, Japanese Patent Application Publication No. 2009-15559 discloses an image processing apparatus that performs image formation under a print condition "label change for each job". Furthermore, Japanese Patent Application Publication No. 2016-68440 discloses a label printer, with no color print function, that generates label data in accordance with names or colors of products to be packed, urges a user to supply appropriate label sheets, and print labels on the sheets.

SUMMARY

By the way, in company offices and so on, members who belong to a section frequently use an image forming apparatus installed in the section to print sheets of documents relevant to a common business theme. In view of the correlation among the printed sheets in terms of business theme, clear indication of the correlation by sticky note colors and attachment positions promotes filing of the printed sheets in the offices.

According to Japanese Patent Application Publications No. 2018-16006 and No. 2009-15559, however, sheet classification is performed based on an idea of changing a sticky note image color for each job. These prior arts do not express how sheets of documents printed in jobs correlate to one another. Due to this, once sheets of documents printed in the image forming apparatuses of these prior arts are stacked flat in offices, users cannot immediately understand contents of the stacked sheets at all, and thus cannot make progress in sheet filing in offices. According to sticky note attachment by hand, meanwhile, it is necessary to determine a rule for classification by sticky note attachment in an office such that a correlation among sheets of documents is clearly indicated. Also, members belonging to the offices need to always ready to follow this rule. Actually, such works of classification rule determination and sticky note attachment are relatively troublesome. Thus, without intending to, some of the members might tend to fail sticky note attachment owing to pressure of business. Assume for example that a member attaches sticky notes to printed sheets irresponsibly based on his memory of the classification rule, and then stacks the sheets flat in separate places. In such a case, it is impossible to immediately understand document contents of the sheets placed in the separate places. Such a disorder of the sheets, whose contents cannot be immediately understood, increasingly deteriorates working conditions.

The present disclosure aims to provide an image forming apparatus that assists systematic filing of printed sheets of documents based on a correlation among a sheet printed in a new job and sheets printed previously.

To achieve the above aim, an image forming apparatus reflecting at least one aspect of the present disclosure is an image forming apparatus that assists classification of printed sheets of documents of print jobs, the image forming apparatus comprising: a correspondence table showing a correspondence between sticky note attributes and keywords, the sticky note attributes representing appearance features of sticky notes that are to be attached to edges of the printed sheets so as to protrude from the edges, the keywords being extracted from the documents of the print jobs and denoting topics of the documents; and a hardware processor that: extracts, in response to an execution request of a new print job, a keyword from a document of the new print job; judges whether the extracted keyword partially matches any of the keywords included in the correspondence table; and creates, when judging positively, a new sticky note attribute having part of an appearance feature represented by the sticky note attribute corresponding to the partially matching keyword included in the correspondence table, and adds the new sticky note attribute to the correspondence table together with the extracted keyword.

BRIEF DESCRIPTION OF THE DRAWING

The advantages and features provided by one or more embodiments of the disclosure will become more fully understood from the detailed description given hereinbelow and the appended drawings which are given by way of illustration only, and thus are not intended as a definition of the limits of the invention. In the drawings:

FIGS. 4A and 4B show setting examples of a color palette 109P and an attachment position gauge 109G, respectively, FIG. 4C shows an example of nine print jobs requested in the image forming apparatus 1000, and FIGS. 4D and 4E show processes of document analysis by a keyword extraction unit 107;

FIGS. 6A to 6F show a processing process of a correspondence table 108T during execution of 1st to 6th print jobs;

FIGS. 7A to 7C show the processing process of the correspondence table 108T during execution of 7th to 9th print jobs;

FIG. 8A shows assignment of sticky note colors and attachment positions to document data pieces printed in print jobs, FIG. 8B shows category tables 108R and 108Q respectively created for users A and B, and FIG. 8C shows the correspondence table 108T updated repeatedly due to execution of nine print jobs;

DETAILED DESCRIPTION OF EMBODIMENTS

Hereinafter, one or more embodiments of an image forming apparatus and a sheet management system of the present disclosure will be described with reference to the drawings. However, the scope of the invention is not limited to the embodiments.

[1] Sheet Management System

Figure 1:
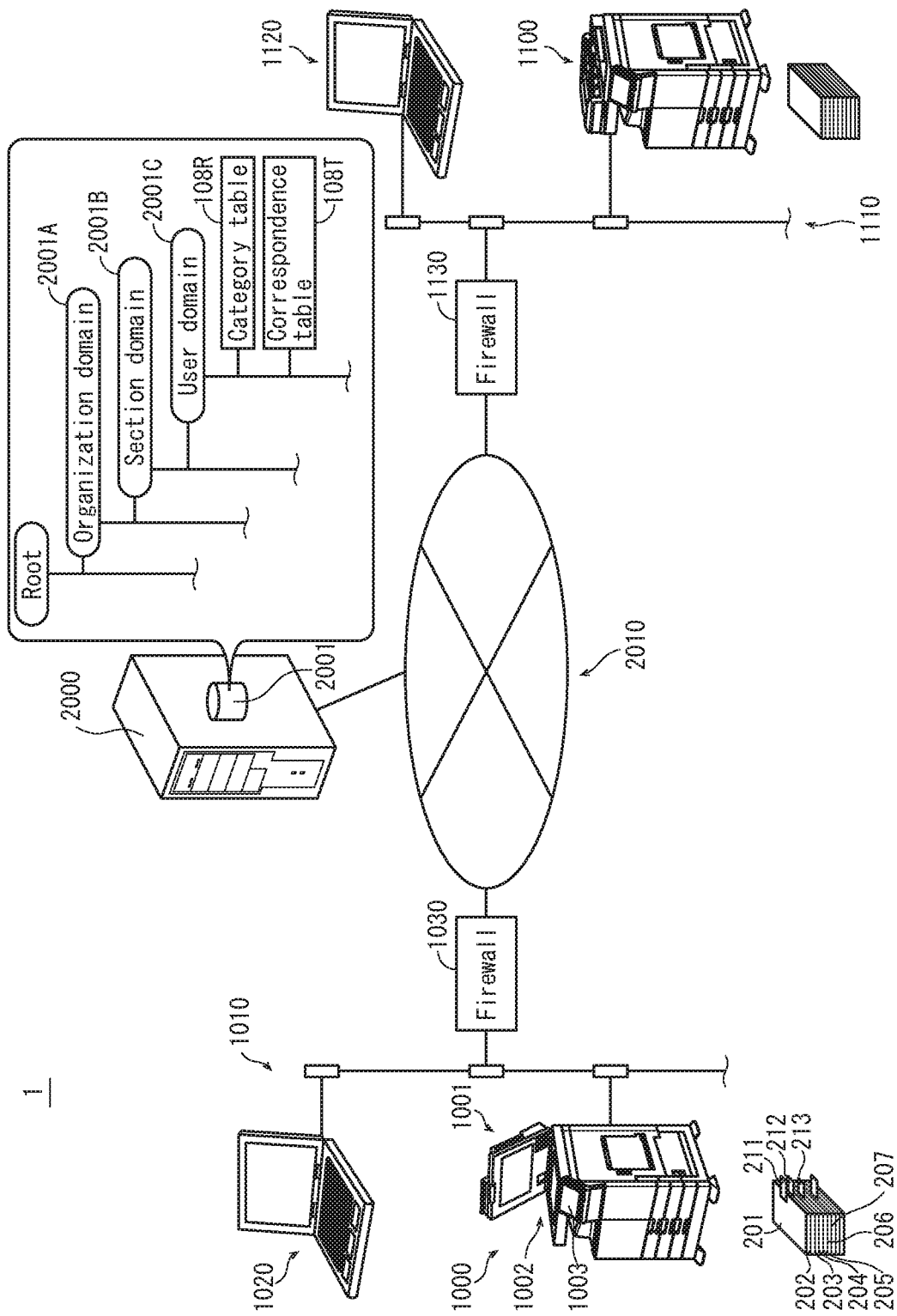
FIG. 1 shows the configuration of a sheet management system 1.

FIG. 1 shows the network configuration of a sheet management system 1 relating to at least one embodiment of the present disclosure. As shown in FIG. 1, the sheet management system 1 includes image forming apparatuses 1000 and 1100, a management server 2000, terminals 1020 and 1120, and firewalls 1030 and 1130.

(1-1) Image Forming Apparatuses 1000 and 1100

The image forming apparatuses 1000 and 1100 are respectively connected to local area networks 1010 and 1110 which are respectively separated by firewalls 1030 and 1130, and execute print jobs requested by users belonging to sections. Such jobs are of two types, file jobs and copy jobs. The former file jobs are jobs of printing document files transmitted from the terminal 1020. Specifically, upon receiving a file job execution request and a document file from the terminal 1020 within the same local, the image forming apparatus 1000 executes a file job by transferring a document of the document file onto sheets.

Meanwhile, the latter copy jobs are jobs executed in accordance with users' copy operations performed on the image forming apparatus 1000. Specifically, upon receiving a copy job execution request, the image forming apparatus 1000 optically scans an original supplied by an automatic document feeder 1001 or an original placed on a platen glass 1002, and transfers the scanned document onto a sheet. The two image forming apparatuses 1000 and 1100 belong to different network groups of different sections, and are accessible to the management server 2000 via the respective firewalls 1030 and 1130. The image forming apparatuses 1000 and 1100 have the common configuration, and accordingly the following description is given on only the image forming apparatus 1000.

(1-2) Management Server 2000

The management server 2000 is a stationary server in the sections or a cloud server, and is connected to a public network 2010. The management server 2000 performs data transmission and reception with image forming apparatuses installed in respective sections, thereby managing the image forming apparatuses belonging to the sheet management system 1 and organizations and users that can use the sheet management system 1. To perform such a management, the management server 2000 includes a storage 2001 for system integrated management. The storage 2001 includes directories 2001A, 2001B, and 2001C. The directory 2001A corresponds to an organization domain of an organization installed with an image forming apparatus. The directory 2001B corresponds to a section domain of a section belonging to the organization. The directory 2001C corresponds to a user domain of a user belonging to the section. The user domain directory 2001C includes information for assisting sheet classification by sticky note attachment, namely a category table 108R and a correspondence table 108T. The user domain directory 2001C is a shared directory that is identified by a locator including file paths of the organization domain directory 2001A, the section domain directory 2001B, and the user domain directory 2001C. The correspondence table 108T is stored in a readable and writable file where file reading and file writing are possible.

(1-2-1) Category Table 108R

The category table 108R shows a category list of documents to be created for printing by a specific user via the sheet management system 1. The user is one of members belonging to a specific section of the organization, and creates documents of a category specialized in works for which the user is responsible. In the sheet management system relating to the present embodiment, considering such characteristics, the image forming apparatus 1000 collects keywords for classification specialized in individual users, and shows the collected keywords on the category table 108R.

(1-2-2) Correspondence Table 108T

The correspondence table 108T shows color and attachment position of sticky notes to be attached at positions on an edge other than a binding edge of a printed sheet, in correspondence with any keyword on the category table 108R. In the correspondence table 108T, keywords are ranked in order of precedence. The correspondence table 108T is created for each combination of size and position of binding edge of sheets to be printed.

[2] Configuration of Image Forming Apparatus 1000

Figure 2:
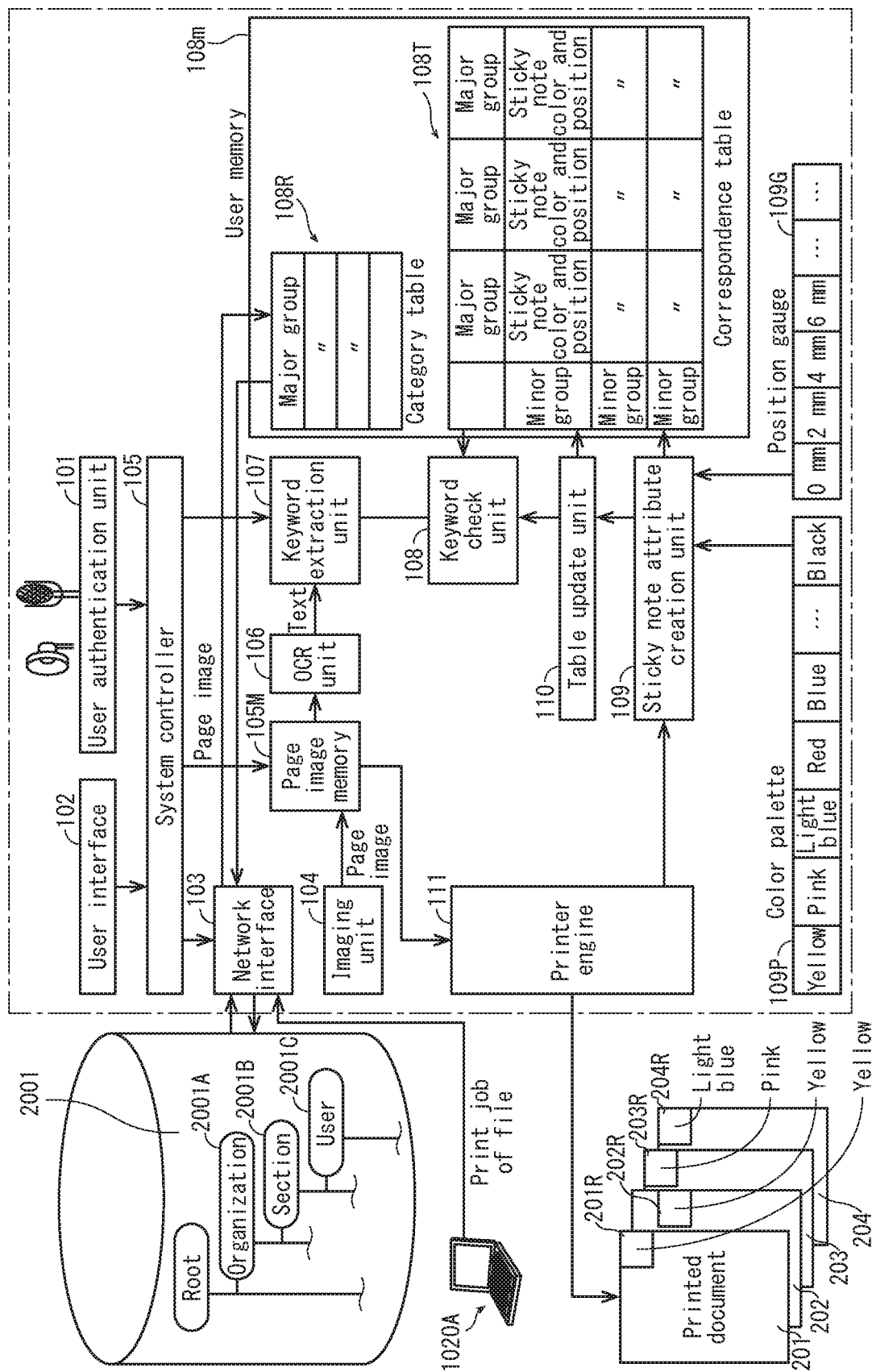
FIG. 2 is a block diagram of the internal configuration of an image forming apparatus 1000.

FIG. 2 shows the internal configuration of the image forming apparatus 1000. As shown in FIG. 2, the image forming apparatus 1000 includes a user authentication unit 101, a user interface 102, a network interface 103, an imaging unit 104, a system controller 105, a page image memory 105M, an optical character recognition (OCR) unit 106, a keyword extraction unit 107, a keyword check unit 108, a user memory 108m, a sticky note attribute creation unit 109, a table update unit 110, and a printer engine 111. The components shown in FIG. 2 are program modules which are executed by a CPU of the image forming apparatus 1000 to cause the CPU to perform processing below.

(2-1) User Authentication Unit 101

Upon a print job execution request is issued by a user, who belongs to the section installed with the image forming apparatus 1000, the user authentication unit 101 verifies authenticity of the user who has issued the request. In the case of a file job, the user authentication unit 101 performs authentication on the terminal 1020, as a counterparty, which requests the image forming apparatus 1000 to execute the job. In the case of a copy job, the user authentication unit 101 performs authentication on a user who wants to use the image forming apparatus 1000, including authentication by password input and authentication using biometric information such as a voiceprint. When the user authentication unit 101 verifies that the user is authentic in the file job or the copy job, the user can use the image forming apparatus 1000.

(2-2) User Interface 102

The user interface 102 receives operations relevant to copy jobs performed on a touch panel display 1003.

(2-3) Network Interface 103

The network interface 103 includes a network interface card. The network interface 103 establishes a logical connection between the image forming apparatus 1000 and the terminal 1020 and a logical connection between the image forming apparatus 1000 and the management server 2000 through a protocol stack such as a physical layer, a data link layer, and a TCP/UDP layer.

The network interface 103 thus performs transmission and reception of a target document file in a print job through the connection established between the image forming apparatus 1000 and the terminal 1020. Also, the network interface 103 performs transmission and reception of the category table 108R and the correspondence table 108T through the connection established between the image forming apparatus 1000 and the management server 2000.

(2-4) Imaging Unit 104

The imaging unit 104 images, by image elements, an original fed by the automatic document feeder 1001 or an original placed on the platen glass 1002, thereby to obtain image data for one page.

(2-5) System Controller 105

In accordance with a copy job execution request received by the user interface 102 from a user or a file job execution request received by network interface 103 from the terminal 1020, the system controller 105 creates image data of each page constituting a document (page image data) on the page image memory 105M. In addition to creation of such page image data, the system controller 105 receives from the user various initial settings for printed sheet classification by sticky note attachment. The initial settings will be described in detail later.

(2-6) OCR Unit 106

The OCR unit 106 performs OCR on the page image data written onto the page image memory 105M thereby to output a text of the document on the page image data.

(2-7) Keyword Extraction Unit 107

The keyword extraction unit 107 extracts a keyword from the text read from the page image data by the OCR unit 106 or a text included in a file name of a document file. A keyword denotes a topic of a document, and is composed of a part relating to sheet classification (hereinafter, major group) and a part relating to sheet content (hereinafter, minor group).

The keyword extraction unit 107 divides the text into morphemes and selects one categorized into major group and one categorized into minor group among the morphemes. Then, the keyword extraction unit 107 pairs the selected major group and minor group to obtain a keyword, and outputs the keyword to the keyword check unit 108. Also, the keyword extraction unit 107 describes the keyword thus obtained into the category table 108R.

(2-8) Keyword Check Unit 108

The keyword check unit 108 checks the keyword extracted by the keyword extraction unit 107 against keywords included in the correspondence table 108T to determine whether the extracted keyword completely matches or partially matches any of the keywords included in the correspondence table 108T. Here, complete match indicates match between keywords in terms of both major group and minor group. Meanwhile, partial match indicates match between keywords in terms of only one of major group and minor group.

(2-9) Sticky Attribute Creation Unit 109

Upon execution of a print job, the sticky note attribute creation unit 109 creates a sticky note attribute of a sticky note to be attached to a sheet of a document printed in the print job. A sticky note attribute is a tangible attribute formed on a printed sheet using a sticky note, and has a role of identifying a sheet printed in each print job. The sticky note attribute represents an appearance feature of the sticky note to be attached. The sticky note attribute creation unit 109 has a color palette 109P and an attachment position gauge 109G. To achieve clear classification of various printed sheets of documents, the sticky note attribute creation unit 109 creates a sticky note attribute reflecting results of judgement by the keyword comparison unit 108.

(2-9-1) Color Palette 109P and Attachment Position Gauge 109G

The color palette 109P indicates a population of sticky note colors that are applicable to sticky note attribute creation and are ranked in order of precedence. The attachment position gauge 109G indicates a population of attachment positions that are applicable to sticky note attribute creation and are ranked in order of precedence. In the case where a keyword in a new print job extracted by the keyword extraction unit 107 neither completely matches nor partially matches the keywords included in the correspondence table 108T, the sticky note attribute creation unit 109 selects a pair of any one of the sticky note colors included in the color palette 109P and any one of the attachment positions included in the attachment position gauge 109G, and determines the selected pair as a sticky note attribute of the new print job.

(2-9-2) Keyword Complete Match

In the case where a keyword in a new print job extracted by the keyword extraction unit 107 completely matches any of the keywords included in the correspondence table 108T, the sticky note attribute creation unit 109 selects a pair of a sticky note color and a sticky note attachment position respectively corresponding to a major group and a small group included in the matching keyword included in the correspondence table 108T. The sticky note attribute creation unit 109 determines the pair thus selected as a sticky note attribute of the new print job.

(2-9-3) Keyword Partial Match

In the case where a keyword in a new print job extracted by the keyword extraction unit 107 matches any of the keywords included in the correspondence table 108T only in terms of major group, the sticky note attribute creation unit 109 selects a sticky note color corresponding to the major group included in the matching keyword included in the correspondence table 108T. Meanwhile, the sticky note attribute creation unit 109 selects any of the sticky note attachment positions from the attachment position gauge 109G other than one corresponding to a minor group paired with the major group included in the matching keyword included in the correspondence table 108T. The sticky note attribute creation unit 109 determines a pair thus selected as a sticky note attribute of the new print job. In the case where the extracted keyword matches any of the keywords included in the correspondence table 108T only in terms of minor group, the sticky note attribute creation unit 109 selects a sticky note attachment position corresponding to the minor group included in the matching keyword included in the correspondence table 108T. Meanwhile, the sticky note attribute creation unit 109 selects any of the sticky note colors from the color palette 109P other than one corresponding to a major group paired with the minor group included in the keyword included in the correspondence table 108T.

In the present embodiment, the sticky note colors are assigned to the major groups on the upper level, and the attachment positions are assigned to the minor groups on the lower level, owing to the limited number of colors selectable as the sticky note colors.

(2-10) Table Update Unit 110

The table update unit 110 newly creates and updates the correspondence table 108T. Upon execution of the initial print job after start-up of the image forming apparatus by the user, the table update unit 110 newly creates the correspondence table 108T. In newly creation of the correspondence table 108T, the table update unit 110 makes correspondence between a sticky note color and a sticky note attachment position which are selected by the sticky note attribute creation unit 109 respectively with a major group and a minor group determined by the keyword extraction unit 107. The table update unit 110 stores the correspondence table 108T clearly showing the correspondence onto the user domain directory 2001C in the management server 2000. This completes newly creation of the correspondence table 108T.

The table update unit 110 updates the correspondence table 108T in accordance with check results of the keyword check unit 108.

The correspondence table 108T has a two-dimensional structure in which major groups and minor groups are arranged respectively in a column direction and a row direction. The arranged major groups and minor groups are ones which have been extracted from documents printed in print jobs which have been executed. The correspondence table 108T thus stores each pair of a sticky note color and a sticky note attachment position, which are compositional elements of a sticky note attribute, in a two-dimensional arrangement position determined by a position of a major group in the column direction and a position of a minor group in the row direction. Furthermore, each time a major group and/or a minor group is newly extracted by the keyword extraction unit 107, the table update unit 110 adds a new arrangement position determined by a position of the major group in the column direction and a position of the minor group in the row direction. The table update unit 110 describes the sticky note attribute created by the sticky note attribute creation unit 109 into the added arrangement position.

(2-11) Printer Engine 111

The printer engine 111 creates an image of a target sheet of a document of a print job in an area on a page other than top, bottom, left, and right margin areas. The printer engine 111 further creates a sticky note margin in only one of the left and right margin areas. In sticky note margin creation, a portion to which a sticky note is to be attached is framed, and a color of the sticky note is indicated inside the frame.

[3] Operations of Image Forming Apparatus

The following describes the operations of the image forming apparatus 1000 having the above configuration.

(3-1) Initial Settings for Sheet Classification Assistance

A user who wants to use the sheet management system 1 firstly boots an initial-setting function for sticky note attachment. The initial-setting function for sticky note attachment is registered as one of applied functions in the system controller 105. The user selects the initial-setting function from a print screen of the terminal 1020 or a basic screen of the touch panel display 1003 to call the initial-setting function registered in the system controller 105. Then, the system controller 105 starts performing initial settings on the keyword extraction unit 107, the keyword check unit 108, and the sticky note attribute creation unit 109. The initial settings are performed on the screen of the terminal 1020 or the screen of the touch panel display 1003 through screen transition shown in FIG. 3A to FIG. 3C.

Figure 3A:
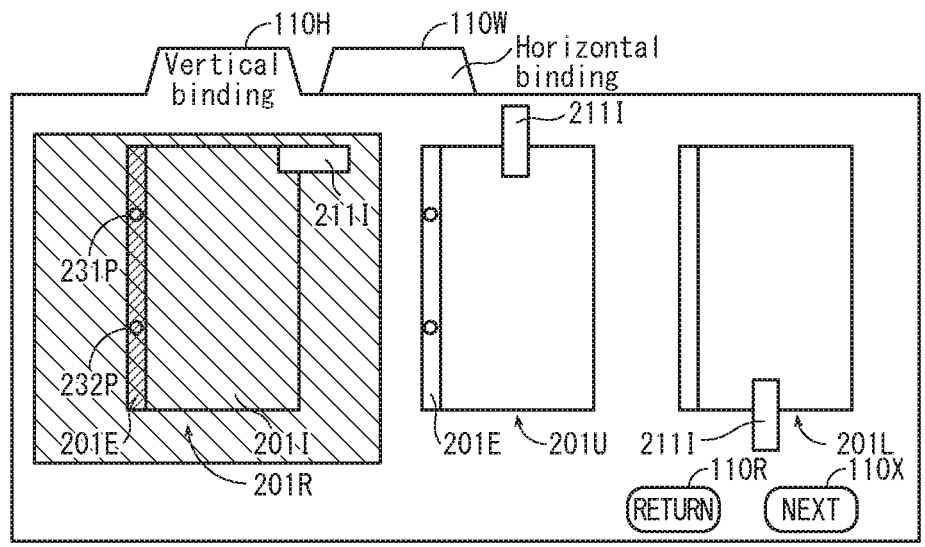
FIG. 3A shows a screen for sheet edge settings for sticky note attachment.
Figure 3B:
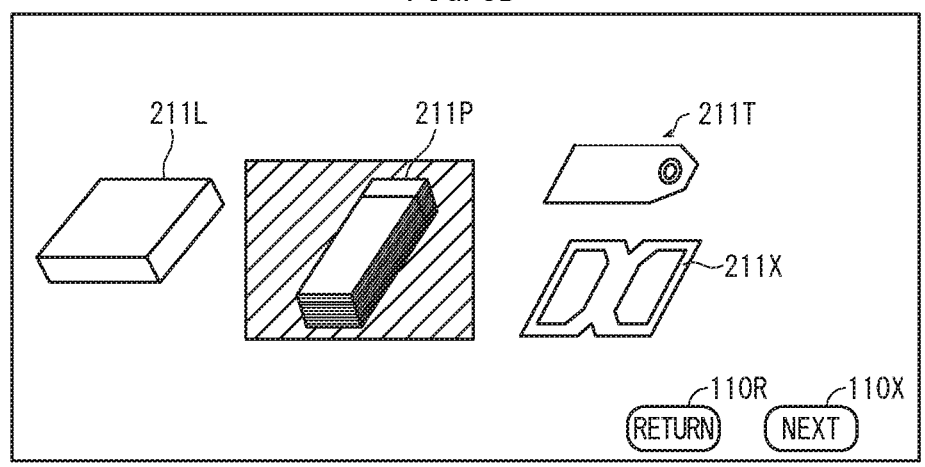
FIG. 3B shows a screen for sticky note type settings.
Figure 3C:
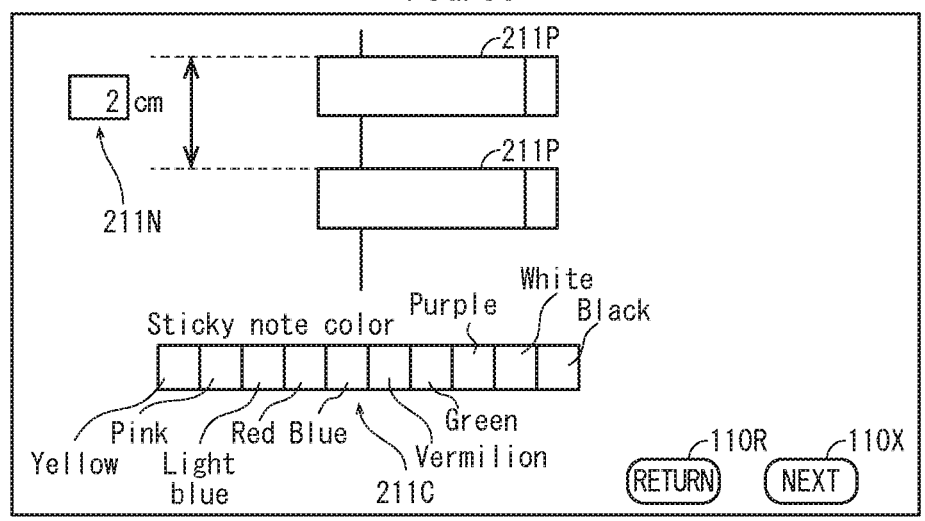
FIG. 3C shows a screen for sticky note margin settings.

FIG. 3A shows a screen for sheet edge settings for sticky note attachment. FIG. 3B shows a screen for sticky note type settings. FIG. 3C shows a screen for sticky note margin settings.

On the screen for sheet edge settings in FIG. 3A, a vertical binding tab 110H and a horizontal binding tab 110W overlap each other. Note that the image forming apparatus 1000 has common paper settings found in many offices, namely, vertical A4-size portrait. In accordance with the sheet settings, the vertical binding tab 110H is arranged in front of the horizontal binding tab 110W in FIG. 3A. The vertical binding tab 110H receives selection of any one of sticky note attachment samples 201R, 201U, and 201L. The sticky note attachment sample 201R has a sticky note image 2111 on a side opposite to a binding side 201E of a portrait sheet. The sticky note attachment sample 201U has the sticky note image 2111 on an upper side of a portrait sheet. The sticky note attachment sample 201L has the sticky note image 2111 on a lower side of a portrait sheet. The user for example selects the sticky note attachment sample 201R among the samples, and pushes down a NEXT button 110X in the figure to perform a positive determination operation. Then, the side opposite to the binding side 201E of the portrait sheet is determined as a target side for sticky note attachment. After determination of the sticky note attachment target side, the system controller 105 switches the screen in FIG. 3A to the screen in FIG. 3B.

On the screen for sticky note type settings in FIG. 3B, images of a label type sticky note 211L, a seal type sticky note 211P, a tag type sticky note 211T, and a tack index type sticky note 211X are displayed. These sticky notes represented by the images are stationery items available for general people. The user can select any of the sticky notes represented by the images. The user for example selects the seal sticky note 211P as an appropriate one among the sticky notes represented by the images in FIG. 3B, and pushes down a NEXT button 110X in the figure to perform a positive determination operation. Note that sticky notes 211 to 215 shown in FIG. 1 and the following description are of the seal type such as the seal sticky note 211P in FIG. 3B). In response to push-down of the NEXT button 110X, the system controller 105 switches the screen in FIG. 3B to the screen in FIG. 3C.

On the screen for sticky note margin settings in FIG. 3C, a numeral input field 211N for receiving an input of arrangement intervals (pitches) for the selected sticky note 211P and a sticky note color list 211C of colors usable for the selected sticky note 211P. The user sets a total length of a width of the sticky note and a certain margin, namely 2 cm, through the numeral input field 211N. Then, the user for example pushes down a NEXT button 110X in the figure to perform a positive determination operation, similarly to those in FIG. 3A and FIG. 3B. In this case, the system controller 105 creates an attachment position gauge 109G and a color palette 109P respectively in accordance with the intervals and the sticky note colors in FIG. 3C. Through the above processing, the color palette 109P and the attachment position gauge 109G are respectively set as shown in FIG. 4A and FIG. 4B.

(3-2) Execution of 1st Print Job

Figure 5:
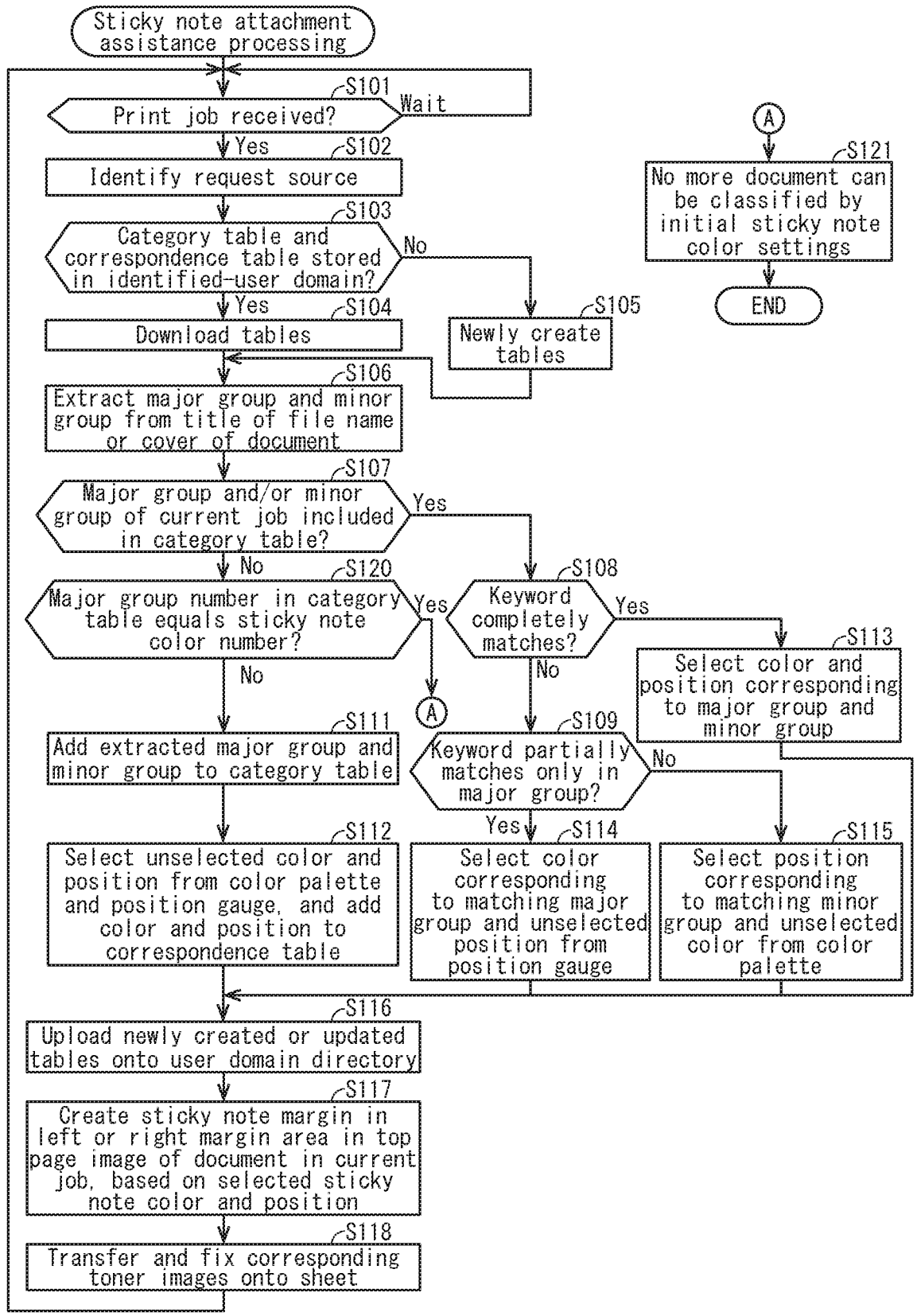
FIG. 5 is a flowchart showing sticky note attachment assistance processing by the image forming apparatus 1000.

After the initial settings through the screens in FIG. 3A to FIG. 3C, the system controller 105 executes a control procedure shown in a flowchart in FIG. 5 showing sticky note attachment assistance processing by the image forming apparatus 1000. Note that a "current job" in FIG. 5 indicates a print job that is currently a processing target among print jobs to be executed by the image forming apparatus 1000.

Upon start-up of the image forming apparatus 1000, the system controller 105 falls in a waiting status for waiting a print job (Step S101).

In this waiting status, the user issues an execution request of the 1st print job among nine print jobs in FIG. 4C to the image forming apparatus 1000. The 1st print job is of a job sequentially printing out document data with a title "Module XXX Functional Specifications".

When a copy job execution request is issued by the user, or when a file job execution request is sent by the terminal 1020, the system controller 105 identifies a request source of the print job (Step S102) and judges whether the category table 108R and the correspondence table 108T are stored in the user domain directory 2001C of the identified user in the storage 2001 (Step S103). Owing to the current job being the first one, the category table 108R and the correspondence table 108T are not stored (Step S103: No). Thus, the category table 108R and the correspondence table 108T are newly created (Step S105).

Next, the keyword extraction unit 107 extracts a major group and a minor group included in a keyword from the title in a file name or a cover of a document file in the print job (Step S106). Here, the keyword extraction unit 107 extracts the title of the document read from the document file, and divides the text of the title into morphemes. Judging from the usage and the meaning of the words, the keyword extraction unit 107 divides the extracted title "Module XXX Functional Specifications" into four words "Module", "XXX", "Functional", and "Specifications" to identify one of the four words that represents the character of the document. Among the above four words, the word "Specifications" is regarded as clearly representing the nature of the document. Also, the word "Functional" is regarded as qualifying the word "Specifications" to form a single expression "Functional Specifications" together with the word "Specifications". The keyword extraction unit 107 determines the expression "Functional Specifications", which is extracted as the words representing the character of the document through the above processing, as a major group for the 1st print job.

Meanwhile, the word "Module" does not represent the character of the document but has a meaning of "Part" or "Component". The keyword extraction unit 107 thus identifies the word "Module" as a main part of a minor group for the 1st print job. Furthermore, the word "XXX" is regarded as meaning an index to be added to any word. Judging from that incorporation of the words "XXX" and "Module" produces a meaning, the keyword extraction unit 107 thus determines this expression "Module XXX" as the minor group for the 1st print job. From the above processing, the minor group "Module XXX" and the major group "Functional Specifications" are determined as shown in FIG. 4D with respect to the document data having the title "Module XXX Functional Specifications".

Next, a sticky note color and a sticky note attachment position for the 1st print job are determined. The sticky note attribute creation unit 109 judges whether at least one of the major group and the minor group of the document in the current job is included in the category table 108R (Step S107). Owing to the current job being the first one, none of the sticky note colors included in the color palette 109P and none of the sticky note attachment positions included in the attachment position gauge 109G have been used yet (Step S107: No).

Then, the sticky note attribute creation unit 109 judges whether the number of the major groups included in the category table 108R is equal to the number of the sticky note colors included in the color palette 109P (Step S120). Owing to the current job being the first one, the category table 108R includes no major group (Step S120: No). Thus, the processing proceeds to Step S111.

In Step S111, the keyword extraction unit 107 adds the major group and the minor group, which are extracted from the title of the document in the print job, to the category table 108R. The newly created correspondence table 108T includes no sticky note color and no sticky note attachment position yet. Thus, in Step S112, a sticky note color yellow ranked first in the color palette 109P and an attachment position at a height of 0 cm ranked first in the attachment position gauge 109G are selected, and the selected sticky note color and attachment position are added to the correspondence table 108T respectively in correspondence with the major group "Functional Specifications" and the minor group "Module XXX". This results in the correspondence table 108T as shown in FIG. 6A.

Then, the category table 108R and the correspondence table 108T, which are newly created, are uploaded onto the management server 2000 to be written into the user domain directory 2001C of the storage 2002 in the management server 2000 (Step S116). Next, as an image of the top page of the document in the current job, a page image is created so as to have a sticky note margin in a left or right margin area based on the selected sticky note color and attachment position (Step S117). Then, toner images which correspond to the page image are transferred and fixed onto a sheet (Step S118).

(3-3) 2nd Print Job

In execution of a 2nd print job, the category table 108R and the correspondence table 108T are stored in the management server 2000 (Step S103: Yes), and thus are downloaded (Step S104). Then, Steps S106 and S107 are performed.

A document in the 2nd print job has a title "Module YYY Functional Specifications". The keyword extraction unit 107 performs morphological analysis on the title in the similar manner as in the 1st print job, thus extracting a minor group "Module YYY" and a major group "Functional Specifications" (Step S106). From the above processing, the minor group "Module YYY" and the major group "Functional Specifications" are determined as shown in FIG. 4E with respect to the document data having the title "Module YYY Functional Specifications".

Next, the sticky note attribute creation unit 109 judges whether at least one of the major group and the minor group of the document in the current job are included in the category table 108R (Step S107). In the case where at least one of the major group and the minor group is included in the category table 108R (Step S107: Yes), the sticky note attribute creation unit 109 further judges whether the keyword of the document in the current job completely matches any of the keywords included in the correspondence table 108T, in other words, matches any of the keywords both in terms of major group and minor group (Step S108). In the case where the keyword of the document in the current job completely matches any of the keywords included in the correspondence table 108T (Step S108: Yes), the sticky note attribute creation unit 109 selects a sticky note color and a sticky note attachment position respectively corresponding to the major group and the minor group included in the matching keyword included in the correspondence table 108T (Step S113).

In the case where the keyword of the document in the current job completely matches none of the keywords included in the correspondence table 108T (Step S108: No), the sticky note attribute creation unit 109 further judges whether the keyword matches any of the keywords included in the correspondence table 108T only in terms of major group (Step S109). Here, in the case where the keyword matches only one of the keywords included in the correspondence table 108T only in terms of major group (Step S109: Yes), the sticky note attribute creation unit 109 selects a sticky note color corresponding to the major group included in the only one matching keyword (Step S114). In the case where the keyword matches two or more of the keywords included in the correspondence table 108T only in terms of major group (Step S109: Yes), the sticky note attribute creation unit 109 selects a sticky note color corresponding to the major group included in one of the two or more keywords which is ranked lowest in the correspondence table 108T.

Meanwhile, in the case where the keyword matches none of the keywords included in the correspondence table 108T only in terms of major group but matches any of the keywords only in terms of minor group (Step S109: No), the sticky note attribute creation unit 109 selects a sticky note attachment position corresponding to the minor group included in the matching keyword included in the correspondence table 108T (Step S115). Here, in the case where the keyword matches only one of the keywords included in the correspondence table 108T only in terms of minor group, the sticky note attribute creation unit 109 selects a sticky note color corresponding to the minor group included in the only one matching keyword. In the case where the keyword matches two or more of the keywords included in the correspondence table 108T only in terms of minor group, the sticky note attribute creation unit 109 selects a sticky note attachment position corresponding to the major group included in one of the two or more keywords which has the lowest rank in the correspondence table 108T.

The correspondence table 108T at the stage shown in FIG. 6A includes no keyword completely matching the keyword "Module YYY Functional Specifications", but includes the major group "Functional Specifications". Thus, the processing proceeds to Step S108: No and Step S109: Yes. Then, a sticky note color and a sticky note attachment position are selected in Step S114. Specifically, a sticky note color "yellow" corresponding to the matching major group "Functional Specifications" is selected. Also, a sticky note attachment position "2 cm", which follows a sticky note attachment position "0 cm" paired with the sticky note color "yellow" corresponding to the matching major group "Functional Specifications", is selected from the attachment position gauge 109G. (Step S114). The sticky note color and attachment position thus selected are added as a sticky note attribute of the current job to the correspondence table 108T. This addition results in the correspondence table 108T as shown in FIG. 6A. In FIG. 6B, an arrow in2 schematically represents selection of the same sticky note color, and an arrow nx2 schematically represents selection of the sticky note attachment position having the following rank.

As a result of the settings of the sticky note color and attachment position for the 2nd print job in this manner, the document printed in the 2nd print job is to have attached thereto a sticky note of the same yellow color as that for the 1st print job at a sticky note attachment position in the vertical direction on the sheet different from that for the 1st print job. Such a sticky note attachment at different positions enables users to understand that functional specifications relating to two different components are stacked on top each other.

(3-4) 3rd Print Job

A document in a 3rd print job has a title "Module XXX Internal Design Material". A text of the title "Module XXX Internal Design Material" is divided into morphemes. Among the morphemes, an expression "Internal Design Material" which is regarded as representing the character of the document is determined as a major group for the 3rd print job (Step S106). Then, a sticky note color and a sticky note attachment position are selected.

The correspondence table 108T at the stage shown in FIG. 6B includes no keyword completely matching the keyword "Module XXX Internal Design Material", but includes the minor group "Module XXX". Thus, the processing proceeds to Step S108: No and Step S109: No. Then, a sticky note color and an attachment position are selected in Step S115. Specifically, the sticky note attachment position "0 cm" corresponding to the matching minor group "Module XXX" is selected. Also, a sticky note color "pink", which follows the sticky note color "yellow" paired with the attachment position "y=0 cm" corresponding to the matching minor group "Module XXX", is selected from the color palette 109P. The sticky note color and attachment position thus selected are added as a sticky note attribute of the current job to the correspondence table 108T. This addition results in the correspondence table 108T as shown in FIG. 6C. In FIG. 6C, an arrow in3 schematically represents selection of the same sticky note attachment position, and an arrow nx3 schematically represents selection of the sticky note color having the following rank.

(3-5) 4th Print Job

The following describes a 4th print job. The correspondence table 108T at the stage shown in FIG. 6C includes no keyword completely matching a keyword "Module XXX Control Procedure Manual", but includes the minor group "Module XXX". Thus, the processing proceeds to Step S108: No and Step S109: No. Then, a sticky note color and a sticky note attachment position are selected in Step S115. Specifically, the sticky note attachment position "0 cm" corresponding to the matching minor group "Module XXX" is selected. Also, a sticky note color "light blue", which follows the sticky note color "pink" paired with the attachment position "y=0 cm" corresponding to the matching minor group "Module XXX", is selected from the color palette 109P. The sticky note color and attachment position thus selected are added as a sticky note attribute of the current job to the correspondence table 108T. This addition results in the correspondence table 108T as shown in FIG. 6D. In FIG. 6D, an arrow in4 schematically represents selection of the same sticky note attachment position, and an arrow nx4 schematically represents selection of the sticky note color having the following rank.

(3-6) 5th Print Job

The following describes a 5th print job. The correspondence table 108T at the stage shown in FIG. 6D includes no keyword completely matching a keyword "Module YYY Internal Design Material", but includes the major group "Internal Design Material". Thus, the processing proceeds to Step S108: No and Step S109: Yes. Then, a sticky note color and an attachment position are selected in Step S114. Specifically, the sticky note color "pink" corresponding to the matching major group "Internal Design Material" is selected. Also, the attachment position "2 cm", which follows the attachment position "0 cm" paired with the sticky note color "pink" corresponding to the matching major group "Internal Design Material", is selected from the attachment position gauge 109G. The sticky note color and attachment position thus selected are added as a sticky note attribute of the current job to the correspondence table 108T. This addition results in the correspondence table 108T as shown in FIG. 6E. In FIG. 6E, an arrow in5 schematically represents selection of the same sticky note color, and an arrow nx5 schematically represents selection of the sticky note attachment position having the following rank.

(3-7) 6th Print Job

The following describes a 6th print job. The correspondence table 108T at the stage shown in FIG. 6E includes no keyword completely matching a keyword "Module ZZZ Functional Specifications", but includes the major group "Functional Specifications". Thus, the processing proceeds to Step S108: No and Step S109: Yes. Then, a sticky note color and an attachment position are selected in Step S114. Specifically, the sticky note color "yellow" corresponding to the matching major group "Functional Specifications" is selected. Also, an attachment position "4 cm", which follows the attachment position "2 cm" paired with the sticky note color "yellow" corresponding to the matching major group "Functional Specifications" is selected, from the attachment position gauge 109G. The sticky note color and attachment position thus selected are added as a sticky note attribute of the current job to the correspondence table 108T. This addition results in the correspondence table 108T as shown in FIG. 6F. In FIG. 6F, an arrow in6 schematically represents selection of the same sticky note color, and an arrow nx6 schematically represents selection of the sticky note attachment position having the following rank.

(3-8) 7th Print Job

The following describes a 7th print job. The correspondence table 108T at the stage shown in FIG. 6F includes no keyword completely matching a keyword "Module ZZZ Internal Design Material", but includes the major group "Internal Design Material". Thus, the processing proceeds to Step S108: No and Step S109: Yes. Then, a sticky note color and an attachment position are selected in Step S114. Specifically, the sticky note color "pink" corresponding to the matching major group "Internal Design Material" is selected. Also, the attachment position "4 cm", which follows the attachment position "2 cm" paired with the sticky note color "pink" corresponding to the matching major group "Internal Design Material", is selected from the attachment position gauge 109G. The sticky note color and attachment position thus selected are added as a sticky note attribute of the current job to the correspondence table 108T. This addition results in the correspondence table 108T as shown in FIG. 7A. In FIG. 7A, an arrow in7 schematically represents selection of the same sticky note color, and an arrow nx7 schematically represents selection of the sticky note attachment position having the following rank.

(3-9) 8th Print Job

The following describes an 8th print job. The correspondence table 108T at the stage shown in FIG. 7A includes no keyword completely matching a keyword "Module YYY Control Procedure Manual", but includes the major group "Control Procedure Manual". Thus, the processing proceeds to Step S108: No and Step S109: Yes. Then, a sticky note color and an attachment position are selected in Step S114. Specifically, the sticky note color "light blue" corresponding to the matching major group "Control Procedure Manual" is selected. Also, the attachment position "2 cm", which follows the attachment position "0 cm" paired with the sticky note color "light blue" corresponding to the matching major group "Control Procedure Manual", is selected from the attachment position gauge 109G. The sticky note color and attachment position thus selected are added as a sticky note attribute of the current job to the correspondence table 108T. This addition results in the correspondence table 108T as shown in FIG. 7B. In FIG. 7B, an arrow in8 schematically represents selection of the same sticky note color, and an arrow nx8 schematically represents selection of the sticky note attachment position having the following rank.

(3-10) 9th Print Job

The following describes a 9th print job. The correspondence table 108T at the stage shown in FIG. 7B includes no keyword completely matching a keyword "Module ZZZ Control Procedure Manual", but includes the major group "Control Procedure Manual". Thus, the processing proceeds to Step S108: No and Step S109: Yes. Then, a sticky note color and an attachment position are selected in Step S114. Specifically, the sticky note color "light blue" corresponding to the matching major group "Control Procedure Manual" is selected. Also, the attachment position "4 cm", which follows the attachment position "2 cm" paired with the sticky note color "light blue" corresponding to the matching the major group "Control Procedure Manual", is selected from the attachment position gauge 109G. The sticky note color and attachment position thus selected are added as a sticky note attribute of the current job to the correspondence table 108T. This addition results in the correspondence table 108T as shown in FIG. 7C. In FIG. 7C, an arrow in9 schematically represents selection of the same sticky note color, and an arrow nx9 schematically represents selection of the sticky note attachment position having the following rank.

After repetition of such processing, the sticky note colors and the attachment positions shown in FIG. 8A are assigned to document data in the 1st to the 9th print jobs.

In FIG. 8A, the major group and the minor group to which sheets of the documents printed in the print jobs belongs are respectively expressed by the sticky note colors such as "yellow", "pink", and "light blue" and the sticky note attachment positions such as "0 mm", "2 mm", and "4 mm".

(3-11) Tables after Repetition of Sticky Note Attachment Assistance Processing

After the above sticky note attachment assistance processing, the category table 108R and the correspondence table 108T are uploaded onto the storage 2001 in the management server 2000. The category table 108R is stored in the user domain directory 2001C in the storage 2002 of the management server 2000. Assume for example that an image forming apparatus is installed in a section to which users A and B belong. The user A is in charge of product development. The user B is in charge of product planning and quality management. Expressions frequently appearing on documents created by these users are shown in tables of FIG. 8B. Specifically, a category table 108R for the user A includes expressions "functional specifications", "internal design material", "control procedure manual", "module XXX", "module YYY", and "module ZZZ". Meanwhile, a category table 108Q for the user B includes expressions "business efficiency", "customer attraction efficiency", "improvement suggestions", "report of improvement results", and so on.

Also, FIG. 8C shows an example of the correspondence table 108T which is stored in the user domain directory 2001C of the storage 2001 after the above sticky note attachment assistance processing. In the correspondence table 108T in FIG. 8C, major groups and minor groups are respectively arranged in the column direction and the row direction, and sticky note colors and attachment positions, which are respectively determined by the major groups and the minor groups, are arranged in pairs in two-dimensional positions determined by pairs of the major groups and the minor groups.

(3-12) Filing of Printed Sheets with Reference to Sticky Notes

Figure 9A:
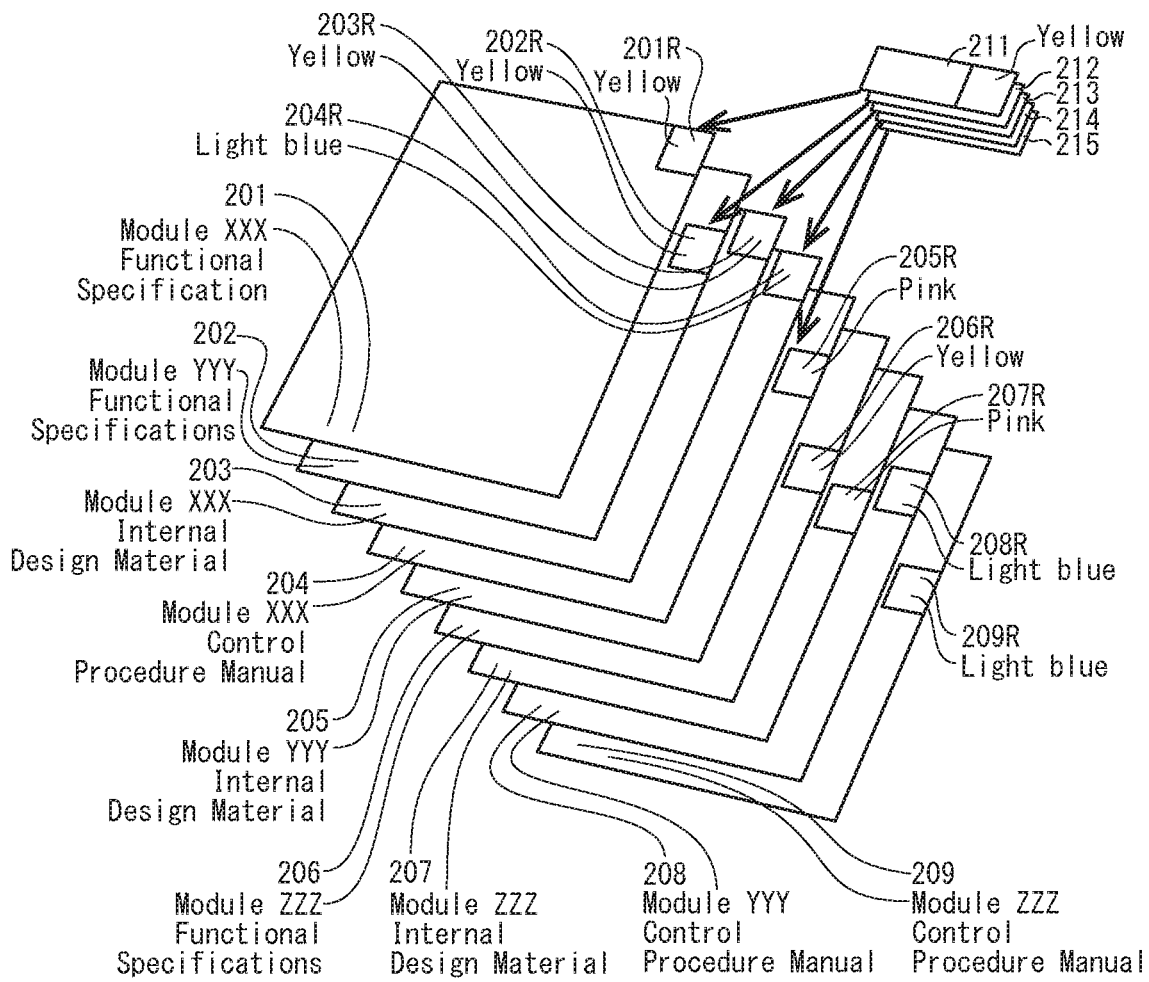
FIG. 9A shows sticky note margins 201R, 202R, 203R, 204R, 205R, . . . formed on nine printed sheets.

In each execution of a print job, a sticky note color and an attachment position selected by the sticky note attribute creation unit 109 are transmitted to the printer engine 111. In response to this, the printer engine 111 creates a sticky note margin (sticky note margins 201R, 202R, 203R, 204R, . . . ) in a margin area on a right edge of a top-page image of a document, as shown in FIG. 9A.

Figure 9B:
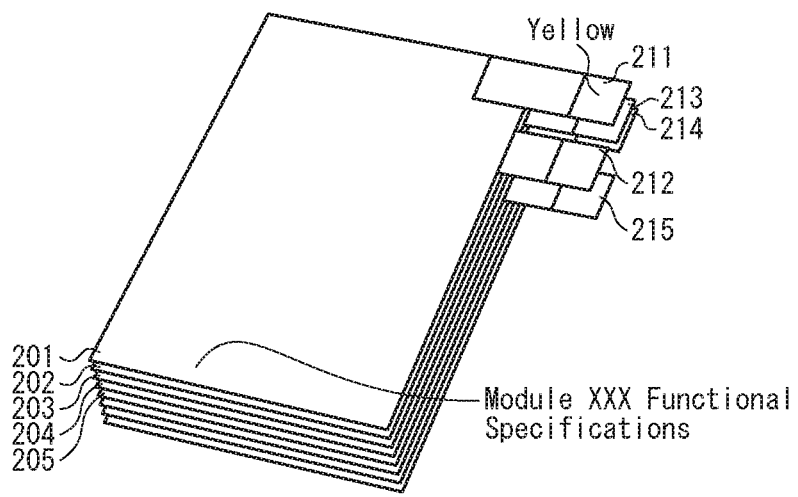
FIG. 9B shows the printed sheets stacked flat with sticky notes 211, 212, 213, 214, 215, . . . attached thereto.

Then, a user attaches sticky notes 211, 212, 213, 214, and 215 respectively to the sticky note margins 201R, 202R, 203R, 204R, and 205R created on the top page images of the documents, such that the sticky notes protrude from the right edges of the sheets. The sheets of the documents, which have sticky notes attached to the sticky note margins on the top page images, are for example stacked flat as shown in FIG. 9B. In this case, even in the case where a sheet of a desired document is not placed on the top of the sheet stack, the user can understand a relationship between a printed sheet placed on the top of the sheet stack and each of printed sheets stacked thereunder, with reference to sticky note colors and attachment positions of the printed sheets of documents.

Figure 10A:
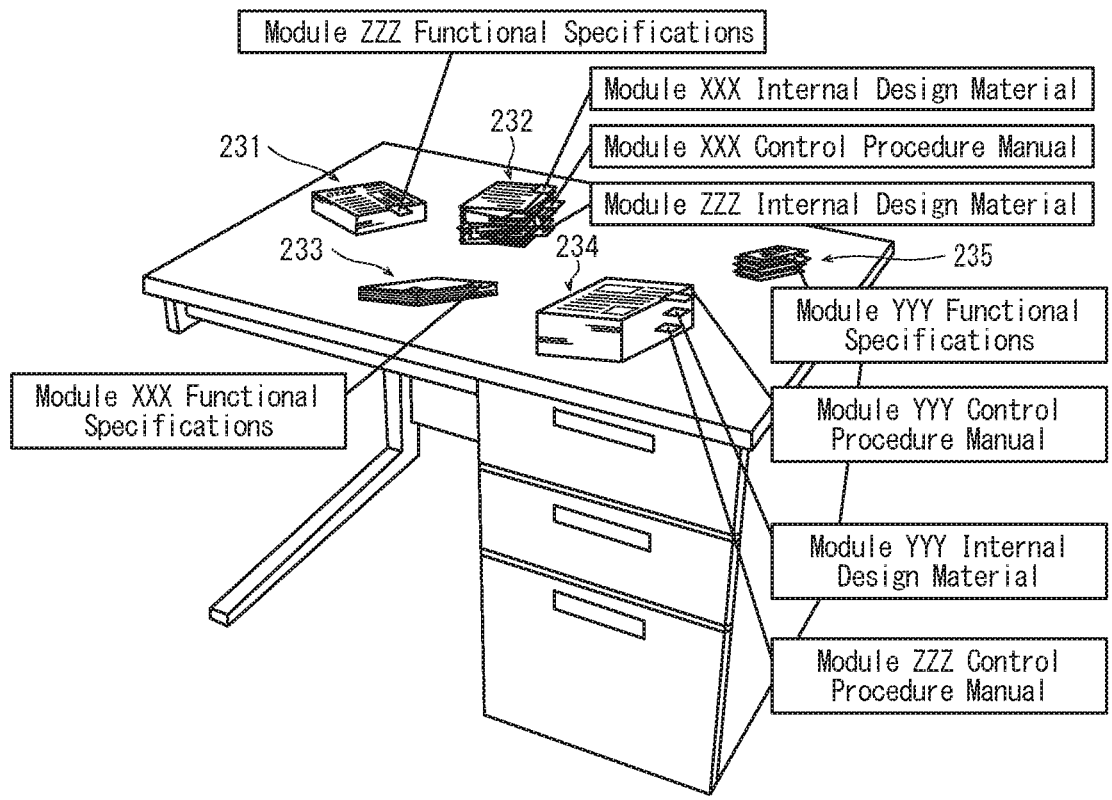
FIG. 10A shows printed sheet bundles 231, 232, 233, 234, and 235 placed at separate positions on a desk.

The sheets of the documents, printed in the five print jobs, to which the sticky notes 211-215 are attached are bound to create sheet bundles 231, 232, 233, 234, and 235, and then the sheet bundles are arranged on separate places in an office as shown in FIG. 10A.

In FIG. 10A, the sheet bundle 232 includes sheets of the document "Module XXX Internal Design Material" on the top thereof, and further includes sheets of two documents thereunder, namely the sheets of the documents "Module XXX Control Procedure Manual" and "Module ZZZ Internal Design Material". It is impossible to catch the details of these two documents judging from appearances.

The sheets of the document "Module XXX Control Procedure Manual" have attached thereto a sticky note of light blue color, which is different from that of the document "Module XXX Internal Design Material", at an attachment position of 0 cm, which is the same as that of the document "Module XXX Internal Design Material". Meanwhile, the sheets of the document "Module ZZZ Internal Design Material" have attached thereto a sticky note of pink color, which is the same as that of the document "Module XXX Internal Design Material", at an attachment position of 4 cm, which is different from that of the document "Module XXX Internal Design Material".

Also, the sheet bundle 234 includes sheets of the document "Module YYY Control Procedure Manual" on the top thereof, and further includes sheets of two documents thereunder, namely the documents "Module YYY Internal Design Material" and "Module ZZZ Control Procedure Manual". It is impossible to catch the details of these two documents judging from appearances.

The sheets of the document "Module YYY Internal Design Material" have attached thereto a sticky note of pink color, which is different from that of the document "Module YYY Control Procedure Manual", at an attachment position of 2 cm, which is the same as that of the document "Module YYY Control Procedure Manual". Meanwhile, the sheets of the document "Module ZZZ Control Procedure Manual" have attached thereto a sticky note of light blue color, which is the same as that of the document "Module YYY Control Procedure Manual", at an attachment position of 4 cm, which is different from that of the document "Module YYY Control Procedure Manual". With reference to the correlation among the sheets of the documents in terms of sticky note color and attachment position, users can understand a relationship between the document placed on the top and each of the documents thereunder of the sheet bundle.

Figure 10B:
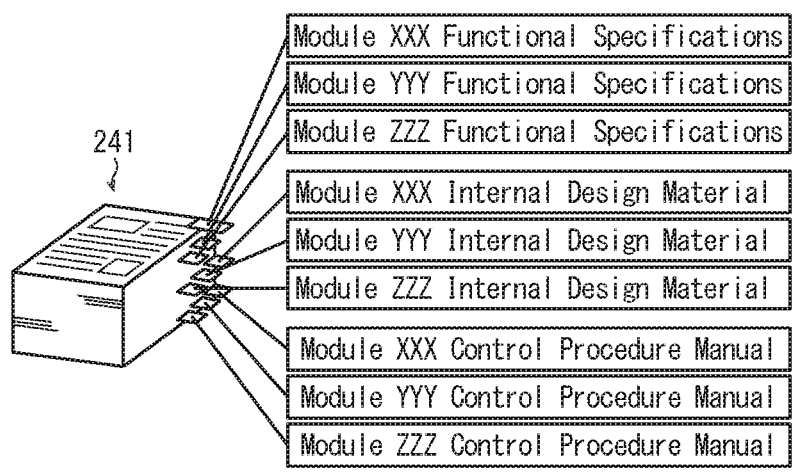
FIG. 10B shows a printed sheet bundle 241 which includes printed sheets stacked in a proper order in accordance with sticky note attachment.

By rearranging the order of stacking printed sheets with reference to the correlation among the printed sheets in terms of sticky note colors and attachment positions, it is possible to bundle the printed sheets in a proper order as shown in FIG. 10B.

(3-13) Print Job Execution by Image Forming Apparatus 1100

The correspondence table 108T and the category table 108R, which are the reference for sticky note attachment, are stored in the storage 2001 of the management server 2000. Here, assume for example that the user A corresponding to the category table 108R moves to the section which uses the network 1110 shown in FIG. 1, and executes a copy job and a file job with use of the image forming apparatus 1100. In this case, the system controller 105 of the image forming apparatus 1100 acquires the category table 108R and the correspondence table 108T corresponding to the user A from the storage 2001 of the management server 2000, and performs processing in accordance with the flowchart in FIG. 5. As a result, printed sheets output from the image forming apparatus 1100 have attached thereto sticky note margins 201R, 202R, 203R, . . . which correspond to the classification based on the correspondence table 108T.

Also, assume for example that the user executes copy jobs and file jobs alternately. In this case, sheets of documents printed in print jobs are classified by systematic sticky note attachment in accordance with the correlation among document titles as long as target expressions in the print job are categorized into major group and minor group included in the correspondence table 108T.

(3-14) Conditions for Ending Sticky Note Attachment Assistance

The following considers the case where the category table 108R includes 10 major groups as a result of repetition of print job execution as above. Then, in response to an execution request for a new print job, the keyword extraction unit 107 extracts a keyword composed of major group and minor group that are not included in the category table 108R. In this case, due to extraction of the keyword matching no major group and minor group in the category table 108R, the processing proceeds to Step S107: No and then Step S120.

Since the number of the major groups included in the category table 108R reaches the number of the sticky note colors included in the color palette 109P, it is impossible to classify sheets of a document in the new print job by using the sticky note attachment which has been initially set in FIG. 3C. Specifically, in Step S120, the number of the major groups included in the category table 108R is equal to the number of the sticky note colors included in the color palette 109P (Step S120: Yes). Then, the touch panel display 1003 displays a warning message that the sheets of the document printed in the new print job cannot be classified by the sticky note attachment which has been initially set (Step S121). Then, the processing ends.

[4] Summary

According to the present embodiment as above, the sticky note margins 201R, 202R, 203R, 204R, . . . are created on sheets of documents printed in print jobs such that the printed sheets are identified by sticky note attachment. Thus, by attaching sticky notes to sheets of documents in accordance with sticky note colors and attachment positions indicated by the sticky note margins, it is possible to efficiently bind correlated printed sheets to create one bundle.

[5] Modifications

Although the present disclosure has been described based on the above embodiment, the present disclosure is of course not limited to the above embodiment. The following modifications may be employed.

(Modification 1)

In the above embodiment, the correspondence table 108T and the category table 108R are managed as information belonging to a user domain. Alternatively, these tables may be managed as information belonging to a specific-group domain. In the present modification, a directory of a specific-group domain is created under a directory of a section domain. The directory of the specific-group domain is identified by a locator including file paths of a directory name of the section domain and a directory name of the specific group.

Since the directory of the group domain is a shared directory with no access restriction which is accessible to any image forming apparatus in the office. The correspondence table 108T and the category table 108R are stored in the directory of the group domain having such characteristics. This allows users who are members of the group to share the correspondence table 108T and the category table 108R which are created under a name of any of the users. Thus, it is possible to systemize printed sheets by sticky note attachment in accordance with a unified rule within the group, thereby promoting filing of printed sheets within the section.

(Modification 2)

In the above embodiment, expressions to be categorized into major groups and minor groups are extracted from document titles. Alternatively, a major group may be created by incorporating a user name and making correspondence with a sticky note color. In the case where users share the correspondence table 108T stored in the directory of the group domain, similar sheets of documents created by any two or more of the users are undistinguishable from one another. In view of this, a major group is created by incorporating a user name in the present modification.

In the case for example where a user AAA issues an execution request for a print job of a document with a title "Module XXX Functional Specifications", a major group "Functional Specifications AAA" is created from the title "Module XXX Functional Specifications". Such a major group including a user name enables to distinguish among sheets of documents. It is possible to classify sheets of documents for each user in accordance with a unified sticky note attachment rule among users, thereby facilitating distinction of sheets of documents.

(Modification 3)

In the above embodiment, the printer engine 111 creates the sticky note margins 201R, 202R, 203R, 204R, . . . on edges of printed sheets. Alternatively, the image forming apparatus 1000 may be provided with a mechanism of attaching sticky notes to printed sheets in accordance with sticky note colors and attachment positions included in the correspondence table 108T. Also, the printer engine 111 of the image forming apparatus 1000 may create sticky note images representing attached sticky notes on edges of sheet images. Furthermore, the touch panel display 1003 or the terminal 1020 of the image forming apparatus 1000 may display colors and attachment positions of sticky notes to be attached to printed sheets.

(Modification 4)

In the above embodiment, sticky note colors correspond to major groups in the correspondence table 108T. Alternatively, any other elements representing sticky note styles may correspond to the major groups in the correspondence table 108T. Specifically, design elements of sticky notes such as the shape of end parts of sticky notes and the pattern of sticky notes or the lengths of sticky notes may correspond to the major groups in the correspondence table 108T.

Also, in the above embodiment, attachment positions correspond to minor groups in the correspondence table 108T. Alternatively, any other elements representing sticky note attachment may correspond to the minor groups in the correspondence table 108T. Specifically, the positions of edges of sheets to which sticky notes are to be attached, the heights on the edges to which sticky notes are to be attached, or the protruding lengths of attached sticky notes from edges may correspond to the minor groups in the correspondence table 108T.

Also, in the above embodiment, expressions to be categorized into major groups and minor groups are extracted from document titles. Alternatively, standard major groups and standard minor groups may be defined in advance, and each word into which divided from a text of a title extracted from a document may be categorized into any of the standard major groups and the standard minor groups, thereby performing sheet classification assistance. Furthermore, the assignment to the column direction and the assignment to the row direction in the correspondence table 108T may be replaced with each other. Specifically, major groups may be assigned to the row direction and minor groups may be assigned to the column direction in the correspondence table 108T.

(Modification 5)

In the above embodiment, a category into which sheets of a document in a current job is classified is determined based on its document title. Alternatively, a category into which sheets of a document in a current job is classified may be determined based on the details of the document. Specifically, in response to a print job execution request, a histogram representing an appearance distribution may be calculated with respect to a document in a current job, and words with a comparatively high level in the histogram may be classified into major groups and minor groups.

(Modification 6)

A word vector incorporation method may be employed. According to this method, words which are included in a title and categorized into major groups and minor groups are each deployed an N-dimensional word vector. In selection of sticky note color and attachment position by the sticky note attribute creation unit 109, a similarity degree and a spatial distance are calculated with respect to word vectors of major groups and minor groups extracted from the title relative to word vectors of the major groups and the minor groups included in the correspondence table 108T. Thus, judgement is made as to whether sheets of documents belong to the same category.

(Modification 7)

In the above embodiment, the correspondence table 108T is created upon execution of the initial print job by a user. Alternatively, the correspondence table 108T, which shows correspondence between some groups and each of sticky note colors and attachment positions, may be stored in a memory 113M, and the sticky note attribute creation unit 109 may select sticky note colors and attachment positions with reference to this correspondence table 108T. Also, the correspondence table 108T may show correspondence between typical groups between each of sticky note colors and attachment positions.

Although one or more embodiments of the present invention have been described and illustrated in detail, the disclosed embodiments are made for the purposes of illustration and example only and not limitation. The scope of the present invention should be interpreted by the terms of the appended claims

What is claimed is:

1. An image forming apparatus that assists classification of printed sheets of documents of print jobs, the image forming apparatus comprising:
   a correspondence table showing a correspondence between sticky note attributes and keywords, the sticky note attributes representing appearance features of sticky notes that are to be attached to edges of the printed sheets so as to protrude from the edges, the keywords being extracted from the documents of the print jobs and denoting topics of the documents; and
   a hardware processor that:
   extracts, in response to an execution request of a new print job, a keyword from a document of the new print job;
   judges whether the extracted keyword partially matches any of the keywords included in the correspondence table; and
   creates, when judging positively, a new sticky note attribute having part of an appearance feature represented by the sticky note attribute corresponding to the partially matching keyword included in the correspondence table, and adds the new sticky note attribute to the correspondence table together with the extracted keyword.

2. The image forming apparatus of claim 1, wherein
   each keyword is composed of a first feature part relating to sheet classification and a second feature part relating to sheet content,
   the correspondence table is a two-dimensional table where first feature parts and second feature parts are respectively arranged in a first direction and a second direction, the first direction being one of a row direction and a column direction, the second direction being the other direction, and
   the correspondence table includes, for each print job, a sticky note attribute in a two-dimensional position determined by a position of a first feature part in the first direction and a position of a second feature part in the second direction.

3. The image forming apparatus of claim 2, wherein
   an appearance feature represented by each sticky note attribute is composed of sticky note style and sticky note attachment position on a printed sheet.

4. The image forming apparatus of claim 3, wherein
   the hardware processor searches the first feature parts arranged in the first direction and the second feature parts arranged in the second direction in the correspondence table,
   when both the first and second feature parts of the extracted keyword are found by the search, the judgment by the hardware processor results in complete match between the extracted keyword and the any keyword included in the correspondence table, and
   when only one of the first and second feature parts is found by the search, the judgment results in partial match between the extracted keyword and the any keyword.

5. The image forming apparatus of claim 4, wherein
   when the first feature part is unfound and the second feature part is found by the search, the hardware processor adds the unfound first feature part to a position in the first direction in the correspondence table, and describes the new sticky note attribute into a two-dimensional position determined by the position of the added first feature part in the first direction and the position of the found second feature part in the second direction in the correspondence table.

6. The image forming apparatus of claim 5, wherein
   the sticky note style is sticky note color,
   the image forming apparatus further comprises
   a color palette indicating a population of selectable colors, and
   when the first feature part is unfound and the second feature part is found by the search, the hardware processor selects one of the colors from the color palette such that an appearance feature represented by the new sticky note attribute is composed of the selected color and the sticky note attachment position corresponding to the found second feature part.

7. The image forming apparatus of claim 4, wherein
   when the first feature part is found and the second feature part is unfound by the search, the hardware processor adds the unfound second feature part to a position in the second direction in the correspondence table, and describes the new sticky note attribute into a two-dimensional position determined by the position of the added second feature part in the second direction and the position of the found first feature part in the first direction in the correspondence table.

8. The image forming apparatus of claim 7, wherein
   the sticky note attachment position is position on an edge of each printed sheet, and
   when the first feature part is unfound and the second feature part is found by the search, the hardware processor selects one of positions on an edge of the printed sheet of the new print job such that an appearance feature represented by the new sticky note attribute is composed of the selected position and the sticky note style corresponding to the found second feature part.

9. The image forming apparatus of claim 4, wherein
   when both the first and second feature parts are unfound by the search, the hardware processor describes the new sticky note attribute into a two-dimensional position determined by a position of a new first feature part in the first direction and a position of a new second feature part in the second direction in the correspondence table.

10. The image forming apparatus of claim 1 further comprising a network interface, wherein
    the hardware processor accesses a management server via the network interface to perform downloading of the correspondence table stored in a storage of the management server, adds the extracted keyword and the new sticky note attribute to the correspondence table, and performs uploading of the correspondence table onto the storage of the management server via the network interface.

11. The image forming apparatus of claim 10, wherein the correspondence table is stored in a region in the storage of the management server, the region being assigned to a specific user, and
the hardware processor performs the downloading and the uploading of the correspondence table, with respect to the region assigned to the specific user.

12. The image forming apparatus of claim 10, wherein the correspondence table is stored in a shared region in the storage of the management server, the shared region being assigned to a specific group to which users belong, and
the hardware processor performs the downloading and the uploading of the correspondence table, with respect to the shared region assigned to the specific group.

13. The image forming apparatus of claim 10, wherein the management server is a compositional element of an information system, and
the keywords included in the correspondence table each partially include one of user names registered in the information system.

14. The image forming apparatus of claim 1, wherein the hardware processor creates a sticky note image on an edge of a sheet image of the new print job in accordance with the new sticky note attribute, the sticky note image representing a sticky note attached to the printed sheet.

15. The image forming apparatus of claim 1, wherein the hardware processor creates a sheet image of the new print job in accordance with the new sticky note attribute, the sheet image having an indication of an area to which a sticky note is to be attached.

16. A sheet management system that includes image forming apparatuses and a management server, and assists sheet classification with use of attachment of sticky notes with respect to sheets of documents printed by the image forming apparatuses executing print jobs, the sticky notes being to be attached to edges of the printed sheets so as to protrude from the edges, wherein
the management server receives a correspondence table created and transmitted by one of the image forming apparatuses, and stores the received correspondence table in a predefined region in a storage,
the correspondence table shows a correspondence between sticky note attributes of the sticky notes and keywords, the sticky note attributes representing appearance features of the sticky notes, the keywords being extracted from the documents of the print jobs and denoting topics of the documents, and
at least one of the image forming apparatuses other than the one image forming apparatus comprises:
the correspondence table; and
a hardware processor that:
extracts, in response to an execution request of a new print job, a keyword from a document of the new print job;
judges whether the extracted keyword partially matches any of the keywords included in the correspondence table; and
creates, when judging positively, a new sticky note attribute having part of an appearance feature represented by the sticky note attribute corresponding to the partially matching keyword included in the correspondence table, and adds the new sticky note attribute to the correspondence table together with the extracted keyword.

* * * * *